US011265490B2

(12) United States Patent
Romanenko et al.

(10) Patent No.: US 11,265,490 B2
(45) Date of Patent: Mar. 1, 2022

(54) SYSTEMS AND METHODS OF SPATIOTEMPORAL IMAGE NOISE REDUCTION FOR MULTISPECTRAL IMAGE DATA

(71) Applicant: Apple Inc., Cupertino, CA (US)

(72) Inventors: Ilya Romanenko, Loughborough (GB); Alex Hayes, Ely (GB)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/901,490

(22) Filed: Jun. 15, 2020

(65) Prior Publication Data
US 2020/0396398 A1 Dec. 17, 2020

(30) Foreign Application Priority Data

Jun. 13, 2019 (GB) ..................................... 1908517

(51) Int. Cl.
*H04N 5/357* (2011.01)
*H04N 5/21* (2006.01)
*H04N 5/33* (2006.01)
*G06T 5/00* (2006.01)
*G06K 9/00* (2006.01)

(52) U.S. Cl.
CPC ........... *H04N 5/357* (2013.01); *G06K 9/0051* (2013.01); *G06T 5/002* (2013.01); *H04N 5/21* (2013.01); *H04N 5/33* (2013.01)

(58) Field of Classification Search
CPC . G06T 2207/10048; G06T 2207/20182; G06T 5/002; H04N 5/332; H04N 5/357; H04N 5/21; G06K 9/0051
See application file for complete search history.

(56) References Cited

U.S. PATENT DOCUMENTS

| 8,953,058 | B2 * | 2/2015 | Ben-Eliezer | ....... H04N 9/04557 |
| | | | | 348/222.1 |
| 9,215,354 | B2 * | 12/2015 | Ogasahara | ............... H04N 5/21 |
| 9,344,689 | B2 * | 5/2016 | Choi | ...................... H04N 9/045 |
| 9,418,398 | B2 * | 8/2016 | Elliott | ...................... G09G 5/02 |
| 9,501,846 | B2 * | 11/2016 | Nakagawa | ............... A61B 3/12 |
| 9,712,724 | B2 * | 7/2017 | Hirooka | ................. H04N 5/243 |
| 9,892,517 | B2 | 2/2018 | Romanenko | |

(Continued)

*Primary Examiner* — Brian P Yenke
(74) *Attorney, Agent, or Firm* — Blank Rome LLP

(57) ABSTRACT

Devices, methods, and non-transitory program storage devices for spatiotemporal image noise reduction are disclosed, comprising: maintaining an accumulated image in memory; and obtaining a first plurality of multispectral images (e.g., RGB-IR images). For each image in the first plurality of multispectral images, the method may: calculate a multispectral guide image for the current image; calculate blending weights for the current image; apply the calculated blending weights to each channel of the current image to generate a denoised current image; and update the accumulated image based on pixel differences between the denoised current image and the accumulated image. In some embodiments, additional images (e.g., the accumulated image and/or other images captured prior to or after a given current image) may also be included in the denoising operations for a given current image. Finally, the method may generate a denoised output image for each input image, based on the updated accumulated image.

20 Claims, 6 Drawing Sheets

(56) References Cited

U.S. PATENT DOCUMENTS

| | | | |
|---|---|---|---|
| 10,038,862 B2* | 7/2018 | Yu | H04N 9/04 |
| 10,339,631 B2* | 7/2019 | Price | H04N 5/332 |
| 10,382,733 B2* | 8/2019 | Huang | H04N 9/646 |
| 10,638,060 B2* | 4/2020 | Liu | G06T 5/002 |
| 10,735,647 B2* | 8/2020 | Liu | H04N 5/33 |
| 10,757,384 B2* | 8/2020 | Douady-Pleven | H04N 9/646 |
| 10,977,781 B2* | 4/2021 | Nie | G06T 5/002 |
| 2006/0033825 A1* | 2/2006 | Li | G06T 5/20 |
| | | | 348/274 |
| 2007/0153335 A1* | 7/2007 | Hosaka | H04N 5/367 |
| | | | 358/463 |
| 2012/0169936 A1* | 7/2012 | Persson | H04N 5/21 |
| | | | 348/609 |
| 2012/0176513 A1* | 7/2012 | Hirose | H04N 9/04553 |
| | | | 348/234 |
| 2015/0350576 A1* | 12/2015 | Zimmer | G06T 5/002 |
| | | | 345/591 |
| 2017/0178361 A1* | 6/2017 | Berezhna | G01N 33/52 |
| 2017/0180683 A1* | 6/2017 | Won | H04N 9/76 |
| 2017/0374299 A1* | 12/2017 | Liu | H04N 1/60 |
| 2018/0040104 A1* | 2/2018 | Lukac | H04N 9/646 |
| 2019/0026876 A1* | 1/2019 | Coleman | G06T 5/50 |
| 2019/0035064 A1* | 1/2019 | Franklin | G06T 7/248 |
| 2019/0098274 A1* | 3/2019 | Douady-Pleven | H04N 9/646 |
| 2019/0110037 A1* | 4/2019 | Lukac | H01L 27/14621 |
| 2020/0007152 A1* | 1/2020 | Fenney | H04N 19/103 |
| 2020/0021782 A1* | 1/2020 | Sugizaki | H01L 27/14685 |
| 2020/0074601 A1* | 3/2020 | Tajbakhsh | G06T 7/90 |
| 2020/0211190 A1* | 7/2020 | Jorgensen | G06T 7/0012 |
| 2020/0226720 A1* | 7/2020 | Mirzaei Domabi | G06N 3/04 |
| 2020/0304732 A1* | 9/2020 | Finlayson | H04N 9/04515 |
| 2020/0396397 A1* | 12/2020 | Hayes | G06T 5/50 |

* cited by examiner

SYSTEMS AND METHODS OF SPATIOTEMPORAL IMAGE NOISE REDUCTION FOR MULTISPECTRAL IMAGE DATA

CROSS-REFERENCE TO RELATED APPLICATION

This application claims priority to the commonly-owned Great Britain patent application bearing serial number GB 1908517.4 and filed Jun. 13, 2019 ("the '517 application"). The '517 application is also hereby incorporated by reference in its entirety.

TECHNICAL FIELD

This disclosure relates generally to the field of digital image processing. More particularly, but not by way of limitation, it relates to techniques for applying spatiotemporal noise reduction (i.e., temporal denoising in addition to 2D-spatial denoising) to digital images, especially digital images comprising multispectral image data.

BACKGROUND

Digital imaging sensors are affected by noise from many potential sources, e.g., the sensor's own circuits, from neighboring pixels on the sensor, and also from interference. Noise is generally undesirable and can often be seen in captured images in the form of static/speckles, fuzziness, or other artifacts. If the imaging sensor is capturing data in a low light environment, the relative contribution of the noise is often even greater and far more noticeable than in a bright light environment.

Noise Reduction (NR) is an approach in digital imaging, by which undesired digital noise is removed from an image captured by an imaging sensor. NR systems may use temporal noise reduction, i.e., comparing one captured image frame to the next and removing any artifacts in each image frame that do not approximately match the next captured image frame. By blending the image frames, the overall noise content in an image may be reduced.

So-called "spatiotemporal noise reduction" techniques attempt to improve on traditional NR technology to enable noise to be filtered even more effectively from the image. As used herein, the term "spatiotemporal noise reduction" or "spatiotemporal digital image noise reduction" refers to the application of temporal denoising techniques (i.e., denoising across corresponding portions of images captured at different times), in addition to 2D-spatial denoising techniques (i.e., denoising within a single image in both the x- and y-directions). Spatiotemporal NR typically works by matching local structure around pixels to find correspondences (e.g., by block matching) between each pixel and its surrounding pixels in both the current image frame (i.e., spatial denoising) and other image frames (i.e., temporal denoising), and then using the combined corresponding information to create output pixels with reduced levels of noise.

In low-light capture conditions, structural correspondences are much less reliable, because the power of the noise may be greater than that of the real detail in the captured image. This characteristic of low-light capture conditions makes both traditional spatial and temporal noise reduction techniques far less reliable—and can cause unwanted motion artifacts. Thus, it would be desirable to have methods and system that provide an improved spatiotemporal digital noise reduction experience in such low-light capture conditions or other capture conditions that are difficult for traditional noise reduction techniques, e.g., by leveraging multispectral image data.

SUMMARY

Imaging sensors capable of capturing multispectral image data including image data in both visible and non-visible wavelength ranges, such as IR, offer the opportunity to increase the accuracy of structural correspondences between captured image frames, preferably by utilizing active multispectral illumination in low-light conditions. This means that, even though the visible light signal strength may be very low, the multispectral signal strength (e.g., which includes non-visible light signal information) may still be appreciably above the level of noise—and can be used to guide spatiotemporal digital image noise reduction techniques.

In some embodiments disclosed herein, the combined visible and non-visible light signals of a multispectral imaging sensor may be used as the basis for noise reduction decisions, providing more noise reduction potential than either visible light (or any other singular spectral band) alone. This combined image information, i.e., comprising both visible and non-visible light information, may be used to help guide noise reductions decisions, particularly in low-lighting situations, by being used to create an image that will also be referred to herein as a "multispectral guide image."

According to some embodiments, a variant of typical noise reduction processes, termed "non-local means" (NLM), may be used in the spatiotemporal NR processing. NLM involves calculating differences between pixel blocks across an extent of an image, and, from those blocks, finding blending weights between pixels to produce output pixels with reduced noise. Preferred embodiments apply NLM that further includes noise normalization, i.e., a process to make the differences between pixel blocks scale relative to estimated amounts of pixel noise in each respective pixel (e.g., based on sensor characteristics and/or scene light level). Noise-guided image frame accumulation is also preferably used to provide a secondary image frame for temporal noise reduction.

The techniques described herein may be implemented on a Field Programmable Gate Array (FPGA) or Application-Specific Integrated Circuit (ASIC) device and may operate in real-time or substantially real-time. The techniques described herein may be implemented on data captured using a multispectral image signal processor (ISP), i.e., an ISP capable of capturing multispectral image data. For example, a multispectral ISP may involve using a sensor having: Red, Green, Blue and Infrared sensing pixels (i.e., an "RGB-IR" sensor); Red, Green, Blue and unfiltered (i.e., white) sensing pixels (i.e., an "RGB-W" sensor); or another desired image sensor pattern.

Devices, methods, and non-transitory program storage devices are disclosed herein to provide a spatiotemporal digital image noise reduction method leveraging multispectral image data that has improved accuracy for performing noise reduction compared with traditional noise reduction systems—especially in low-light situations and/or when noise reduction is performed across multiple images captured over an interval of time.

According to some embodiments, there is provided a method for image processing, comprising: maintaining an accumulated image in memory; and obtaining a first plurality of multispectral images. For each image in the first plurality of multispectral images, e.g., as it is obtained, the method may: calculate a multispectral guide image for the current image; calculate blending weights for the current image based, at least in part, on the multispectral guide image; apply the calculated blending weights (e.g., in parallel) to each channel of the current image (e.g., R, G, B, and IR channels) to generate a denoised current image; and update the accumulated image based on pixel differences between the denoised current image and the accumulated image. The pixel differences determined between the current and accumulated images may be noise-normalized. Finally, the method may generate a noise-reduced output image based on the updated accumulated image, e.g., as each image in the first plurality of multispectral images is done being processed.

According to other embodiments, there is provided a method for image processing, comprising: maintaining an accumulated image in memory; and obtaining a first plurality of multispectral images. For each image in the first plurality of multispectral images, e.g., as it is obtained, the method may: calculate a multispectral guide image for each of the current image and the accumulated image; determine first differences between pixels within first blocks of pixels in the multispectral guide image for the current image and second blocks of pixels in the multispectral guide image for the current image; determine second differences between pixels within blocks of pixels in the multispectral guide image for the accumulated image and blocks of pixels in the multispectral guide image for the current image; calculate blending weights for the current image and the accumulated image based, at least in part, on the determined first differences and second differences; denoise the current image based on the calculated blending weights; and update the accumulated image based on the denoised current image. Finally, the method may generate a noise-reduced output image based on the updated accumulated image, e.g., as each image in the first plurality of multispectral images is done being processed.

Various non-transitory program storage device embodiments are disclosed herein. Such program storage devices are readable by one or more processors. Instructions may be stored on the program storage devices for causing the one or more processors to perform any of the image spatiotemporal noise reduction techniques for multispectral image data disclosed herein.

Various programmable electronic devices are also disclosed herein, in accordance with the program storage device and method embodiments enumerated above. Such electronic devices may include one or more image capture devices, such as optical image sensors/camera units; a display; a user interface; one or more processors; and a memory coupled to the one or more processors. Instructions may be stored in the memory, the instructions causing the one or more processors to execute instructions in accordance with the various techniques disclosed herein.

DETAILED DESCRIPTION

Figure 1:
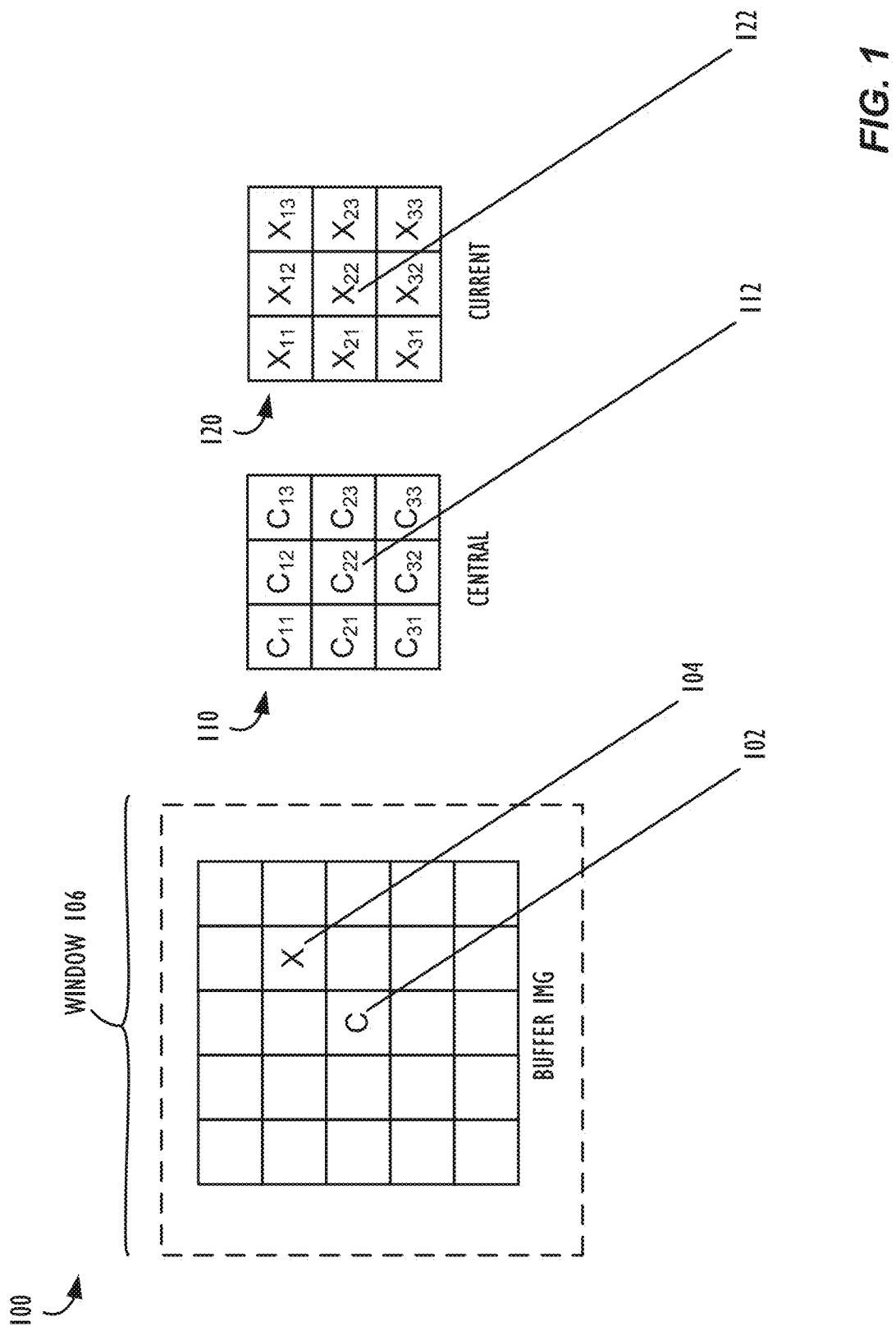
FIG. 1 illustrates an exemplary multispectral image-guided block matching process, according to one or more embodiments.

In the following description, for purposes of explanation, numerous specific details are set forth in order to provide a thorough understanding of the inventions disclosed herein. It will be apparent, however, to one skilled in the art that the inventions may be practiced without these specific details. In other instances, structure and devices are shown in block diagram form in order to avoid obscuring the inventions. References to numbers without subscripts or suffixes are understood to reference all instance of subscripts and suffixes corresponding to the referenced number. Moreover, the language used in this disclosure has been principally selected for readability and instructional purposes and may not have been selected to delineate or circumscribe the inventive subject matter, and, thus, resort to the claims may be necessary to determine such inventive subject matter. Reference in the specification to "one embodiment" or to "an embodiment" (or similar) means that a particular feature, structure, or characteristic described in connection with the embodiments is included in at least one embodiment of one of the inventions, and multiple references to "one embodiment" or "an embodiment" should not be understood as necessarily all referring to the same embodiment.

As used herein, the terms "multispectral image" or "multispectral image data" refers to captured images or image data having a first set of channels comprising captured light information over a first range of wavelengths (also referred to herein as "primary channels") and at least one additional channel comprising captured light information over a second range of wavelengths (also referred to herein as "multispectral channels"), wherein the first and second ranges of wavelengths may be non-contiguous (or at least partially non-overlapping). In some examples, the multispectral channel of multispectral image data may predominantly measure light information in a non-visible wavelength range (e.g., infrared (IR) or ultra-violet (UV) ranges), while the primary channels of the multispectral image data may predominantly measure light information in a visible wavelength range (e.g., red, green, or blue channels). The availability of multispectral image data comprising both visible light information and corresponding non-visible light information from a captured scene may be used to improve or enhance the quality of a captured image. The techniques described herein may be used with active illumination in visible, non-visible, or a combination of visible and non-visible wavelength ranges. When the active illumination is in the non-visible wavelength ranges only, such active illumination may be used in low lighting conditions, which can improve performance even in instances when a user does not want a visible or perceptible camera flash.

In other examples, one or more of the channel(s) of a multispectral image or multispectral image data may comprise a "mixed channel," i.e., a channel that measures light in both visible and non-visible wavelength ranges, as in the case of some RGB-W sensors, e.g., when used without an IR-cut filter. In that case, the response of the red channel is technically a mix of Red+IR, the green channel a mix of Green+IR, the blue channel a mix of Blue+IR, and the white channel a mix of Red+Green+Blue+IR. By solving this linear system of equations, the response to the IR signal in the captured scene may be isolated and treated as separate a multispectral channel, if desired.

In some cases, however, it may be preferable to use mixed channel image data in "sensor color space" directly (i.e., while individual pixels may still include both visible and non-visible light information) in the performance of various image processing operations, such as noise reduction. One reason for performing image processing operations before attempting to decorrelate the non-visible light information from the visible light information in the various mixed channels is so that there will be a more predictable noise response during the image processing operations (e.g., some additive sensor noise models are only applicable before non-linear image data processing, such as would be used to isolate the non-visible light information, is applied).

As used in the various examples described in detail herein, the term "multispectral image" or "multispectral image data" will refer to image data that includes at least some IR signal data (unless otherwise noted), although it is to be understood that, in other examples, multispectral image data need not necessarily include IR signal data specifically or non-visible data generally, and may instead include captured light information over any two or more non-contiguous (or at least partially non-overlapping) wavelength ranges.

Input Image Data

The input image data to a given spatiotemporal NR operation may comprise a first plurality of N-channel multispectral images. In the examples described here, the multispectral images will comprise RGB-IR images, though, as noted above, this particular combination of image channels is not strictly necessary. The plurality of N-channel multispectral images may be obtained from a finite sequence of multispectral images or from a continuous stream of multispectral images, such as those captured from an electronic device having one or more image capture devices. In some embodiments, such as those wherein the obtained multispectral images comprise RGB-IR data, the RGB and IR RAW sensor data may each be extracted and demosaiced based upon the sensor's pixel pattern (e.g., a Bayer pattern) using an appropriate interpolation method (e.g., bilinear interpolation), thereby producing full-resolution red, green, blue, and IR image channels. Typically, at this stage, the red, green, and blue image channels may actually comprise a combination of visible and non-visible image signals (i.e., each of the red, green, and blue channels also captured some amount of IR signal). As alluded to above, it may be preferable to use such input image data in "sensor color space" directly (i.e., while individual pixels may still include both visible and non-visible signal) in the performance of various image processing operations, such as noise reduction, so that there might be a more predictable noise response.

Another option for input image data is to decorrelate the visible (e.g., red, green, and blue) and multispectral (e.g., IR) image signals before noise reduction, using an appropriate decorrelation method (e.g., using a 4×3 IR subtraction matrix or the method of patent application serial number U.S. Ser. No. 16/825,633, which is herein incorporated by reference in its entirety).

Multispectral Guide Images

According to some embodiments, as each image is obtained from the first plurality of multispectral images, one or more so-called "multispectral guide images" may be calculated. In some embodiments, a multispectral guide image may be calculated using a maximum operation on an N-channel multispectral input image channels, thereby producing a combined greyscale guide channel (also referred to herein as a multispectral guide image), which hopefully has reduced noise characteristics. For example, if, at a given pixel location in an input image, the given pixel has: a red channel intensity value of 5 (e.g., on a scale of 0 to 255), a green channel intensity value of 0, a blue channel intensity value of 8, but an IR channel intensity value of 125, then, assuming the use of a maximum operation, the given pixel location's value in the calculated multispectral guide image may be set to '125.' As such, despite there not being much visible light information in the image at the given pixel location, correspondences with other portions of the image may still be identified (e.g., based on similarity in non-visible light information values) and leveraged to assist in noise reduction operations.

According to some spatiotemporal NR embodiments described herein (which will also be referred to as "primary embodiments" for ease of reference), a multispectral guide image may be calculated for only the currently obtained image from the first plurality of multispectral images. Such primary embodiments are described in further detail below with regard to FIG. 4A. According to other spatiotemporal NR embodiments described herein (which will also be referred to as "secondary embodiments" for ease of reference), a multispectral guide image may also be calculated for an accumulated image, which, as will be described in further detail below, refers to an image whose pixel values are denoised and updated during the noise reduction operations, as additional images are obtained from the first plurality of multispectral images. According to some secondary embodiments, if it is desired to included further images in the noise reduction operations (e.g., in addition to a current image and an accumulated image), such as additional previously captured or "future"-captured images (i.e., image frames captured after the current image, e.g., in the case of operating on image frames stored in a video frame buffer), then multispectral guide images may also be calculated for such further images, as well. Such secondary embodiments are described in further detail below with regard to FIG. 4B.

As will be explained in further detail below, according to some primary embodiments described herein, a multispectral guide image may only be calculated for the current image for each iteration through the spatiotemporal noise reduction processing operations to be performed on a plurality of multispectral input images. According to some secondary embodiments described herein, a multispectral guide image may be calculated for the accumulated image (i.e., in addition to the current image) for each iteration through the spatiotemporal noise reduction processing operations to be performed on each of a plurality of multispectral input images. According to such secondary embodiments, the same multispectral guide image calculation process may also be repeated for any number of other image frames desired to be used as additional inputs to the spatiotemporal noise reduction processing operations.

Multispectral Image-Guided Block Matching for Noise Reduction

As mentioned above, spatiotemporal NR operations typically work by matching local structure around pixels to find correspondences (e.g., by a process known as block matching correspondence) between each pixel and its surrounding pixels, e.g., in both the current image frame (i.e., spatial denoising) and other image frames (i.e., temporal denoising), and then using the combined corresponding information to determine blending weights, which may be applied to create output pixels with reduced levels of noise.

Accord to embodiments disclosed herein, the block matching correspondences in spatiotemporal NR operations are preferably calculated using the information in a calculated multispectral guide image (which has reduced noise characteristics). Preferably, the matching operations may be carried out prior to any decorrelation of the visible (e.g., RGB) and non-visible (e.g., IR) image data in the multispectral image, although it is also possibly to carry out matching operations after the image data has been decorrelated.

According to some embodiments, the noise reduction process may involve determining a set of blending weights via block matching, e.g., by using a sliding pixel window, W, that moves across the image plane. (In FPGA/ASIC designs, the window size may actually be limited by the number of pixel lines available in working memory during execution of the pixel matching operations.) This window may be of any size, but, in typical implementations, it may be 7×7 or 9×9 in usable pixels (plus extra buffering pixels for block calculations, as will be described below).

Turning now to FIG. 1, an exemplary multispectral image-guided block matching process 100 for noise reduction is illustrated, according to one or more embodiments. In FIG. 1, a 5×5 window 106 is used for ease of illustration. A 3×3 block of pixels 110 around the central pixel, C (102), in the window 106 in the multispectral guide image may be used as the basis for all comparisons in the window region. As shown in FIG. 1, for the case of a 3×3 block size, C (102) and X (104) in the window 106 diagram are equivalent to $C_{22}$ (112) and $X_{22}$ (122) in the pixel blocks 110 and 120, respectively. This block 110/120 can be a neighborhood of pixels around a central pixel having predetermined dimensions of any desired size, but 5×5 pixels or 3×3 pixels is typically sufficient.

Next, blocks 120 of the same size (referred to herein as "X") as the central block 110 are taken from every location across the window 106. FIG. 1 shows an example of this. An arbitrary location has been chosen for X (104) in FIG. 1, i.e., one pixel up and one pixel to the right of the center pixel, C (102). As may now be understood, in a given implementation, a block for every location within the sliding window 106 may be calculated. For each block location, pixel-wise differences may be calculated between each of the given block's pixels (120) and the pixels of the central window block (110).

According to some primary embodiments described herein, a multispectral guide image may only be calculated for the current image for each iteration through the spatiotemporal noise reduction processing operations to be performed on each of a plurality of multispectral input images. As such, the pixel-wise differences described here with reference to FIG. 1 would comprise comparisons between different blocks of pixels within the multispectral guide image calculated for the current image (i.e., intra-frame comparisons). According to some secondary embodiments described herein, a multispectral guide image may also be calculated for the accumulated image (i.e., in addition to the current image) for each iteration through the spatiotemporal noise reduction processing operations to be performed on each of a plurality of multispectral input images. As such, the pixel-wise differences described here with reference to FIG. 1 would further comprise comparisons between different blocks of pixels in the multispectral guide image calculated for the accumulated image back to blocks of pixels within the multispectral guide image calculated for the current image (i.e., inter-frame comparisons, in addition to the intra-frame comparisons between different blocks of pixels within the multispectral guide image calculated for the current image, as discussed immediately above with regard to the primary embodiments).

For a given multispectral guide image (i.e., whether it be for a current image or an accumulated image, or some other image), a distance measure, such as an L1 or L2 norm (i.e., a sum of absolute differences or a square root of the sum of squared differences) may be determined for a vector of pixel-wise differences in each block of the respective multispectral guide image. For simplicity, the following equation provides an example that may be used to calculate this distance measure using the L1 norm for a 3×3 block, creating the output sum $D_X$ (with the understanding that using an L2 norm, or some other distance measure, may provide better results, in some implementations):

$$D_X = \sum_{a=1}^{3} \sum_{b=1}^{3} |C_{ab} - X_{ab}|. \quad \text{(Eqn. 1)}$$

These summed differences may then be divided by the noise estimate of the respective multispectral guide image, $\sigma_N$, at that pixel (or multiplied by its inverse). This means that the summed differences are now noise-normalized, i.e., normalized relative to the expected level of noise in the respective multispectral guide image. An additional global multiplication or division factor, k, may also be added at this stage to affect the general sensitivity of the noise reduction algorithm.

The noise-normalized summed differences may then be provided to an inverse exponential function (or 1D LUT providing an approximation to this function). Such a function may cause blocks with small differences to have high blending weights (and, thus, a relatively larger impact on the denoising operation), and it may cause blocks with large differences to have small blending weights (and, thus, a relatively smaller impact on the denoising operation). The total calculation to produce these blending weights $B_X$ from $D_X$ may be calculated as follows:

$$B_X = e^{-\frac{D_X * k}{\sigma_N}}. \quad \text{(Eqn. 2)}$$

According to some primary embodiments described herein, once the $B_X$ blending weights for the current image frame are known, they may be applied to each of the N-channels of the current image (e.g., in parallel) to generate a denoised current image. Then, the accumulated image may be updated based on pixel differences between the denoised current image and the accumulated image, as will be explained in further detail below in the Section entitled, "Noise-Guided Accumulated Image Frame Generation," thereby completing the noise reduction operations for a given iteration of the spatiotemporal noise reduction processing operations.

According to some secondary embodiments described herein, once the $B_X$ blending weights for the current image frame are known, the calculation of $B_X$ (e.g., according to Eqns. 1 and 2, above) may be repeated between the multispectral guide image calculated for the current image frame and the multispectral guide image calculated for the accumulated image frame, e.g., using block values for X from a new window W at the corresponding location in the multispectral guide image calculated for the accumulated image frame. This results in a total of M×N×2 values of $B_X$ per pixel, where M and N are the window dimensions (i.e., M×N values for each pixel based on the blending weights calculated for the current image and M×N values for each pixel based on the blending weights calculated for the accumulated image). According to some secondary embodiments, guide images could be calculated for additional image frame inputs (e.g., the aforementioned "previous" or "future" image frames) and then also be used in the denoising operations, if so desired.

According to some secondary embodiments described herein, the blending weights for a previous image frame (e.g., the accumulated image) can also be tuned slightly before being used to create an output pixel. In areas of the image with motion, the weights may be overestimated, which may lead to undesirable motion artifacts. In areas of the image that require large amounts of denoising, the weights may actually be underestimated, e.g., due to temporal variations between pixel intensities, and the noise reduction may not be sufficiently powerful.

To help reduce these problems, in some preferred secondary embodiments, $B_X$ may be modulated for the previous image frame (e.g., the accumulated image) as follows, where $B_H$ and $B_L$ are high and low weight thresholds:

If $B_X < B_L$, set $B_X$ to 0.
If $B_X > B_H$, multiply $B_X$ by a modulation factor, M (e.g., setting M to a value >1).
If $B_H > B_X > B_L$, multiply $B_X$ by a value between 0 and M, e.g., depending on the exact value of $B_X$.

The vector of weights (e.g., concatenated between all images desired to be used in the denoising operation) may then be jointly normalized (i.e., as one larger set of weight values) to sum to some specified value, $B_K$, so that each of the images being used in the denoising operation may be combined in the determined proportions to denoise the running accumulated image.

Output Pixel Calculation

As alluded to above, once the desired blending weights are determined, each channel of the N-channel multispectral input images may be blended, e.g., in parallel, using the determined $B_X$ blending weight values to produce a denoised version of an input image, i.e., N-channel outputs of image information with reduced noise. To apply the blending weights and denoise a desired image, for each of the N-channels of the desired image, the local window of pixels at the same location as the window, W, used in multispectral block matching may be multiplied by the corresponding $B_X$ weights and divided by $B_K$ (or simply bit shifted, if $B_K$ is a power of 2) to produce N outputs at the current pixel location, C.

If the desired N-channel image is referred to as I, then the value of its corresponding (i.e., noise-reduced) output image, O, at a given pixel location $O_C$, for a given channel, may be calculated as:

$$O_C = \frac{\Sigma_{X \in W} B_X I_X}{B_K}. \quad \text{(Eqn. 3)}$$

Note that, Eqn. 3 above reflects an equation that may be employed according to some primary embodiments, i.e., wherein only the $B_X$ blending weights for the current image are used in the generation of the denoised output image pixels for the current image. It is to be understood that, in secondary embodiments, i.e., wherein other image frame(s), e.g., an accumulated image or one or more additional "previous" or "future" image frames, are used in the denoising operation, the $B_X$ blending weights for the current image and the other image frame(s) could be combined and considered as one larger set of blending weights, $\{B_X'\}$, which may be jointly normalized and then applied to produce a denoised version of the current image.

Alternatively, the N-channel multispectral images may be converted into a luminance representation and N-D color differences, and this 1-D luminance channel may be blended in the same way, i.e., using the $B_X$ blending weights and $B_K$ value. Then, the output noise-reduced luma channel may be used to calculate N-D outputs, e.g., using the color differences.

Noise-Guided Accumulated Image Frame Generation

According to embodiments disclosed herein, an ongoing accumulated image frame may be generated, based on each new denoised current image frame obtained and the previous version of the accumulated image frame. Differences, e.g., absolute pixel differences, may be calculated between the denoised current image frame and the current version of the accumulated image frame, which value is referred to herein as: ΔI. In some preferred embodiments, the ΔI values may be noise-normalized, e.g., by being divided by the estimate of noise standard deviation at each pixel. According to some embodiments, this estimate may be based on a pre-calibrated noise profile for the sensor, which may be found from a combination of the sensor noise profile and the pixel intensity. According to some embodiments, the following calculation may be used:

$$\Delta I_N = \frac{\Delta I}{\sigma_N}, \quad \text{(Eqn. 4)}$$

where $\sigma_N$ refers to the standard deviation of the estimated noise.

Based on the value of $\Delta I_N$, each updated accumulated pixel value in the accumulated image may be calculated based on a desired set of rules or heuristics. According to one embodiment, the rules may be as follows:

If $\Delta I_N > T_H$, blend 10% of the accumulated pixel with 90% of the new pixel value from the denoised current image (because there is likely a drastic change at the pixel, e.g., motion, so the accumulation should effectively be reset).

If $\Delta I_N < T_L$, blend 85% of the accumulated pixel with 15% of the new pixel value from the denoised current image (this case may represent the maximum accumulation strength that a system will assign, as it reflects a situation where there is likely no significant change or motion at the pixel, and thus it is safer to heavily blend with the accumulated pixel).

If $T_H \geq \Delta I_N \geq T_L$, blend a moderate amount of the new pixel value from the denoised current image with the accumulated pixel, depending on the exact value of $\Delta I_N$ (because, in this case, the level of motion or other change is uncertain).

In the rules enumerated above, $T_H$ and $T_L$ represent high and low noise thresholds, respectively, and may be set to 2 and 0.5, according to some embodiments. This accumulation image process can significantly reduce noise in the output image, but it can still leave some motion artifacts, as it is calculated at each pixel, based only on noise estimation and absolute differences. Thus, as described above, according to some secondary embodiments, the accumulated image frame may be used as a secondary input to a spatiotemporal digital image noise reduction algorithm, i.e., along with the current image frame. As may now be appreciated, the accumulated image may be updated with each iteration through the loop of noise reduction processing operations performed on the plurality of multispectral input images and may be used to generate a noise-reduced output image for each current input image, either without further modification, or after the performance of any desired further post-processing operations.

SPATIOTEMPORAL DENOISED MULTISPECTRAL IMAGE EXAMPLES

Figure 2:
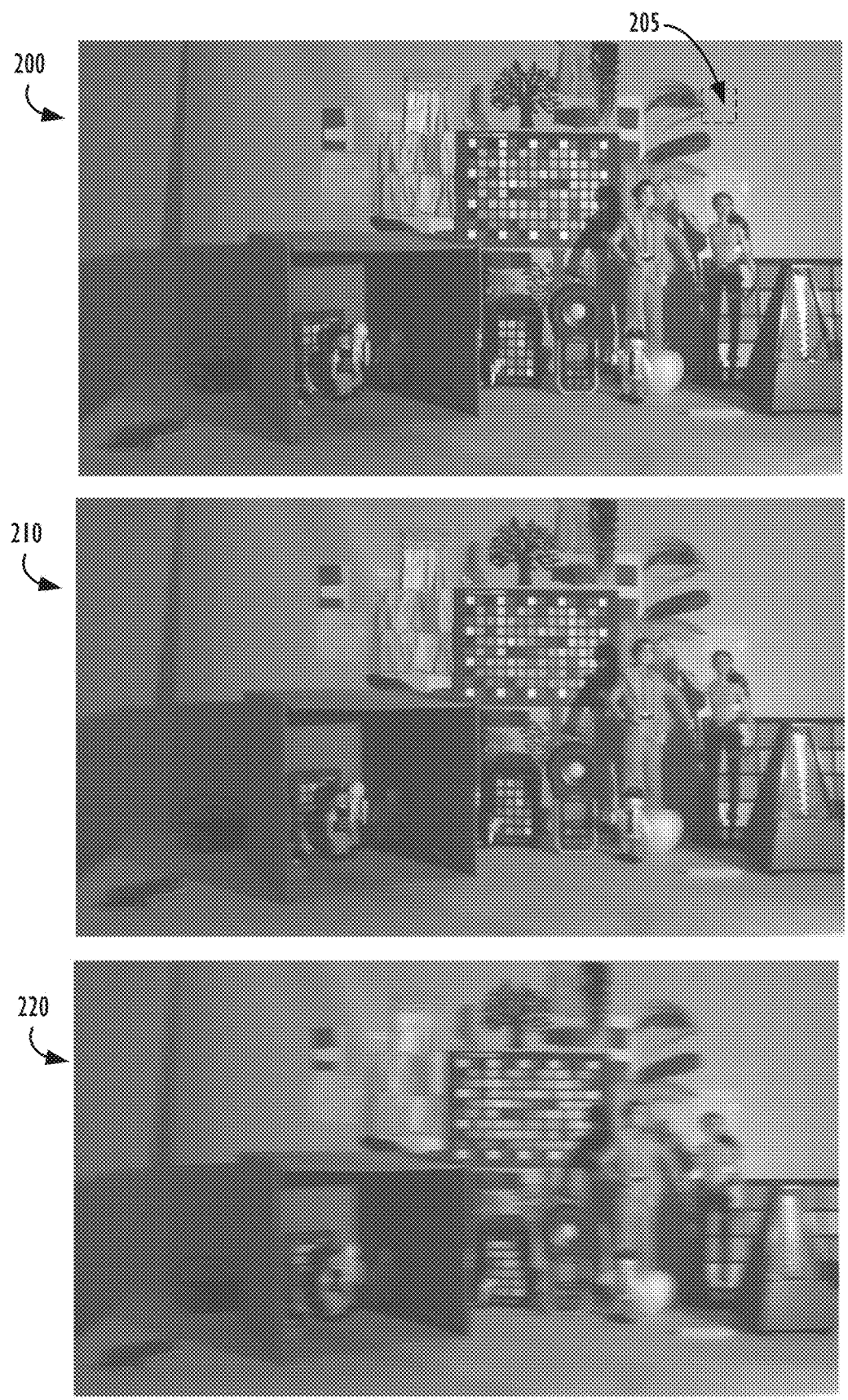
FIG. 2 illustrates an exemplary current input image, exemplary accumulated input image, and an example of naïve image frame averaging, according to one or more embodiments.

FIG. 2 illustrates an exemplary current input image (200), exemplary accumulated input image frame (210), and an example of naïve image frame averaging (220), according to one or more embodiments. In this example, exemplary accumulated input image frame (210) has been accumulated over 30 image frames, with significant motion during the accumulation process. As shown in image 220, with a naïve image frame averaging approach, e.g., an approach to NR that does not utilize the accumulated image frame techniques described herein, there are severe artifacts in the resultant image, due to the aforementioned motion during the capture process.

Figure 3:
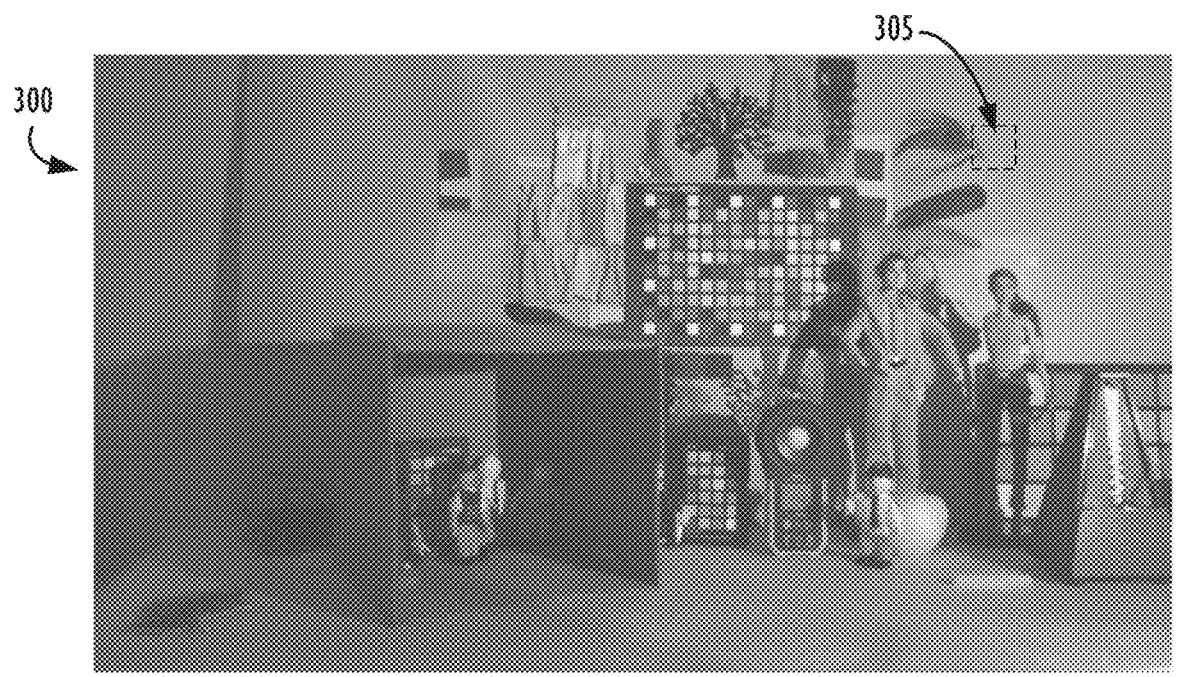
FIG. 3 illustrates an exemplary spatiotemporal noise reduced image and a zoomed-in comparison between the original input image frame and the spatiotemporal denoised image, according to one or more embodiments.
Figure 3:
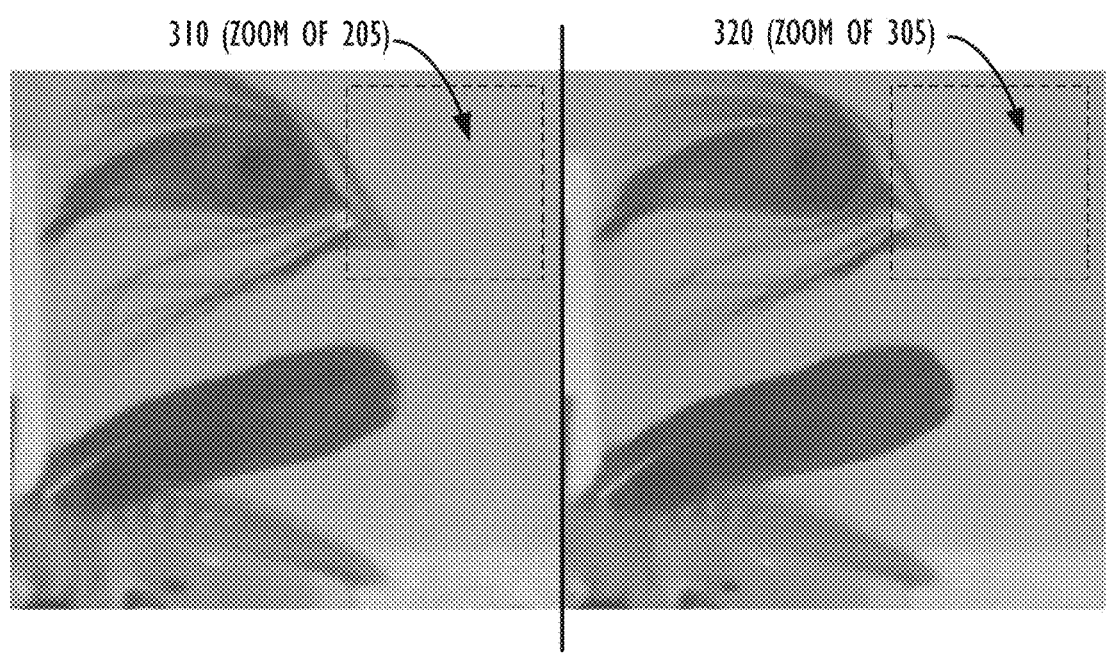

FIG. 3 illustrates an exemplary spatiotemporal noise reduced image (300) and a zoomed-in comparison between the original input image frame (310) and the spatiotemporal denoised image (320), according to one or more embodiments. Exemplary spatiotemporal noise reduced image (300) shows the luma output of applying a spatiotemporal noise reduction method leveraging multispectral image data on the inputs from exemplary current input image (200) and exemplary accumulated input image frame (210). As is illustrated, noise is greatly reduced, while the residual local and global motion artifacts in the accumulated image frame in noise reduced image (300) are largely eliminated.

The zoomed-in comparison between portion 205 of the original input image frame 200 (labeled 310) and portion 305 of the spatiotemporal denoised image frame 300 (labeled 320) shows that noise is greatly reduced in spatiotemporal denoised image 300, while finer details are preserved.

Figure 4A:
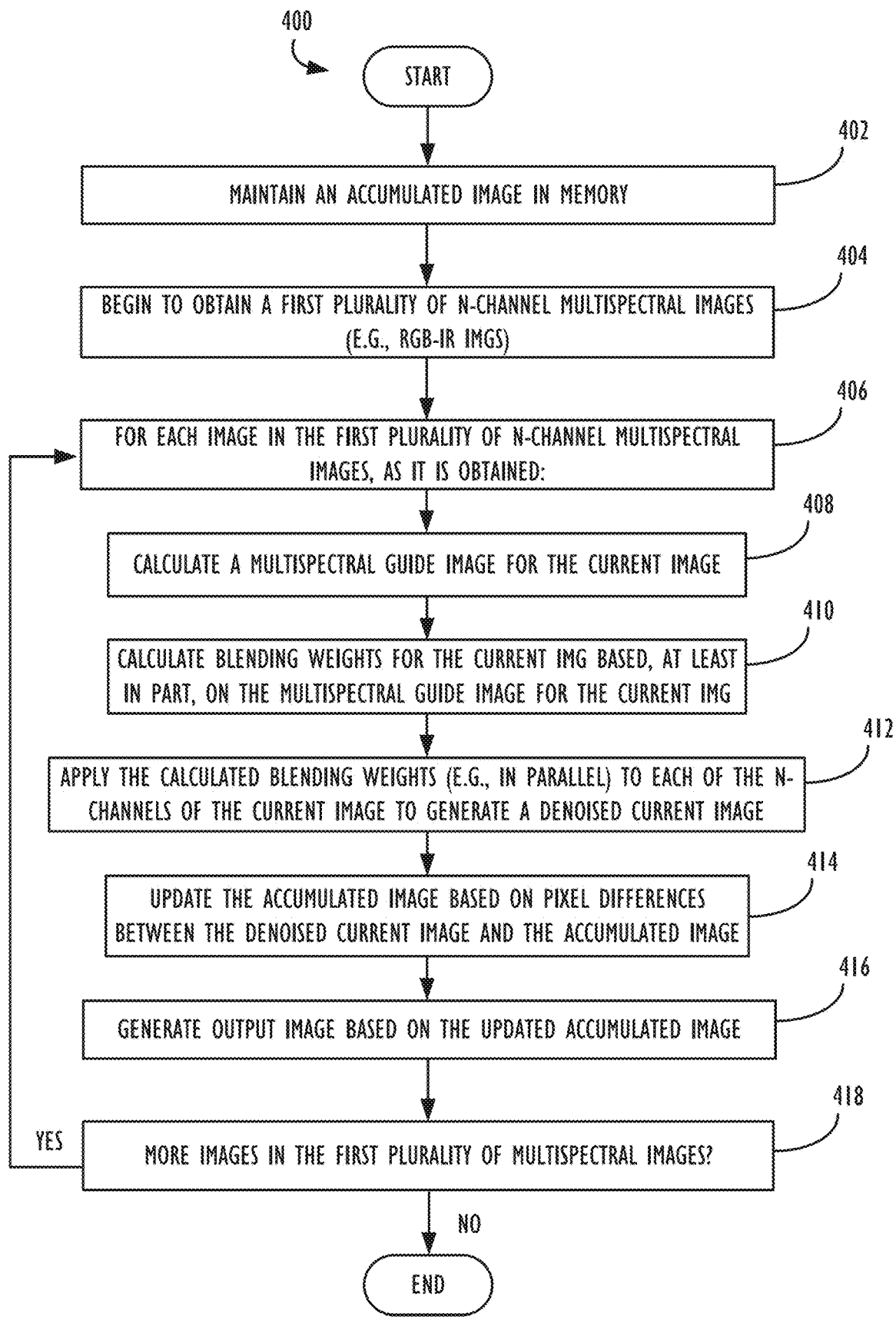
FIGS. 4A and 4B are flow charts illustrating methods of performing spatiotemporal digital image noise reduction, according to various embodiments.

Exemplary Spatiotemporal Digital Image Noise Reduction Operations for Multispectral Image Data Referring now to FIG. 4A, a flow chart is shown, illustrating a method 400 of performing spatiotemporal digital image noise reduction according to one or more embodiments described herein, also referred to as "primary embodiments." First, at Step 402, the method 400 may begin to maintain an accumulated image in memory. Next, at Step 404, the method 400 may begin to obtain a first plurality of N-channel multispectral images (e.g., RGB-IR images), e.g., either from a finite sequence of multispectral images or a continuous stream of multispectral images, such as those captured from an electronic device having one or more image capture devices. In some embodiments, the accumulated image created at Step 402 may be initialized with the first image obtained from the first plurality of multispectral images.

Next, at Step 406, for each image in the first plurality of multispectral images, e.g., as it is obtained, the method 400 may: calculate a multispectral guide image for the current image (Step 408); calculate blending weights for the current image based, at least in part, on the multispectral guide image for the current image, e.g., using block matching with sliding windows to compare blocks of pixels across the extent of the multispectral guide image for the current image against each other (i.e., intra-frame block matching comparisons) (Step 410); apply the calculated blending weights (e.g., in parallel) to each of the N channels of the current image (e.g., R, G, B, and IR channels) to generate a denoised current image (Step 412); and update the accumulated image based on pixel differences between the denoised current image and the accumulated image (e.g., as described above in the Section entitled, "Noise-Guided Accumulated Image Frame Generation") (Step 414). As described above, the pixel differences determined between the current and accumulated images may be noise-normalized. The method 400 may then proceed to Step 416 to generate an output image based on the updated accumulated image. If there are further images in the first plurality of multispectral images to process (i.e., "YES" at Step 418), the method 400 may return to Step 406 to continue processing on the next image in the first plurality of multispectral images. If, instead, there are no further images in the first plurality of multispectral images to process (i.e., "NO" at Step 418), the method 400 may terminate.

Figure 4B:
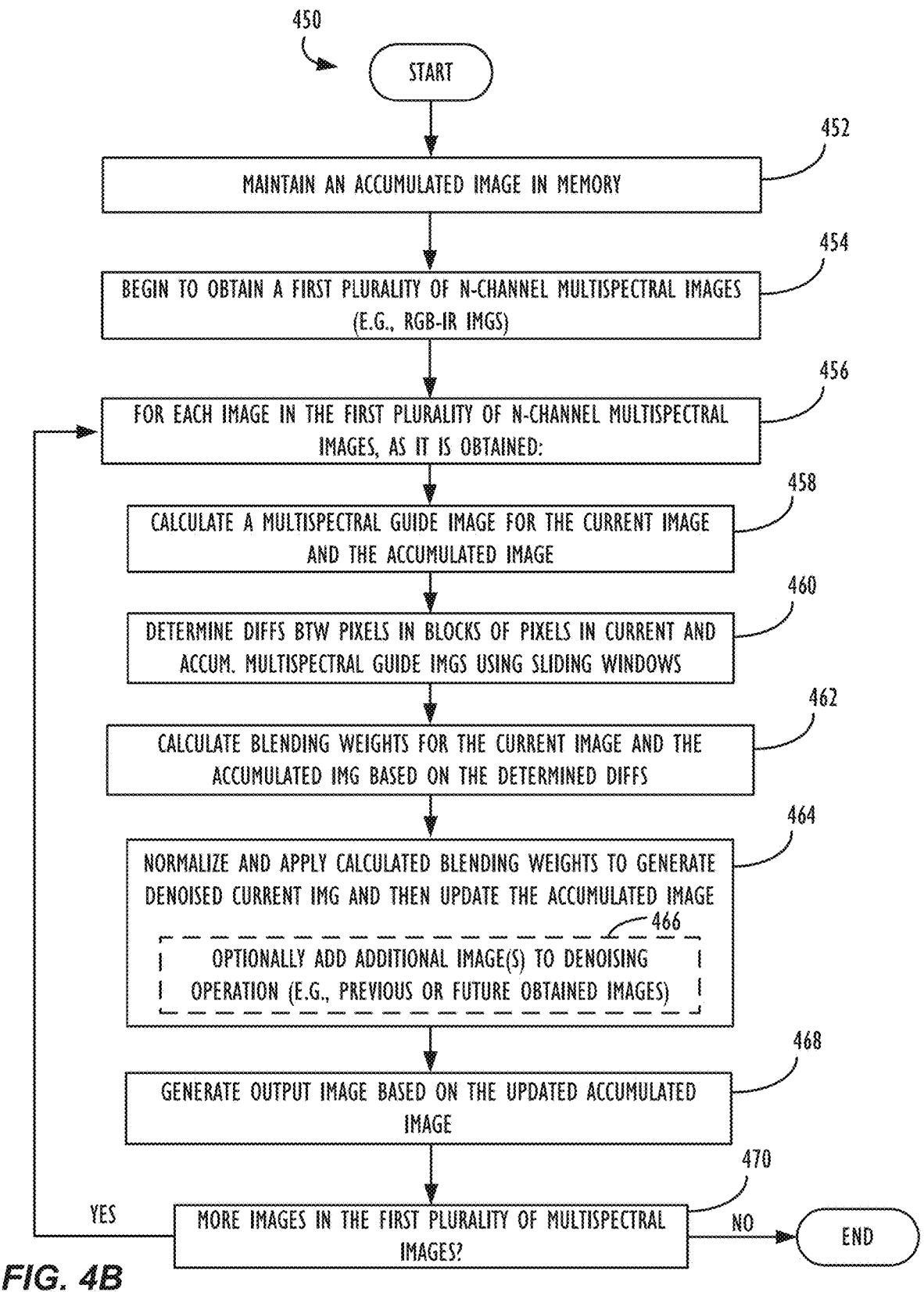

Referring now to FIG. 4B, a flow chart is shown, illustrating a method 450 of performing spatiotemporal digital image noise reduction according to one or more embodiments described herein, also referred to as "secondary embodiments." First, at Step 452, the method 450 may maintain an accumulated image in memory. Next, at Step 454, the method 450 may obtain a first plurality of multispectral images (e.g., RGB-IR images), e.g., either from a finite sequence of multispectral images or a continuous stream of multispectral images, such as those captured from an electronic device having one or more image capture devices. In some embodiments, the accumulated image created at Step 452 may be initialized with the first image obtained from the first plurality of multispectral images.

Next, at Step 456, for each image in the first plurality of multispectral images, e.g., as it is obtained, the method may: calculate a multispectral guide image for the current image and the accumulated image (Step 458); determine first differences between pixels within first blocks of pixels in the multispectral guide image for the current image and second blocks of pixels in the multispectral guide image for the current image (i.e., intra-frame comparisons), and also determine second differences between pixels within blocks of pixels in the multispectral guide image for the accumulated image and blocks of pixels in the multispectral guide image for the current image (i.e., inter-frame comparisons), again, e.g., using block matching techniques with sliding windows (Step 460); calculate blending weights for the current image and the accumulated image based, at least in part, on the determined first differences and second differences (Step 462); and normalize and apply the calculated blending weights to denoise the current image based on the calculated blending weights, which denoised current image may then be used to update the accumulated image (e.g., as described above in the Section entitled, "Noise-Guided Accumulated Image Frame Generation") (Step 464).

Optionally, at Step 466 (e.g., as sub-part of Step 464), the method 450 may add additional image(s) to the denoising operation (e.g., previously obtained images and/or 'future' obtained images, which may exist, e.g., in the case of operating on image frames stored in a video frame buffer, where one or more images may have been captured after the "current" image being processed by method 450). As described above, in embodiments where other image frames, e.g., an accumulated image, past images, future images, etc., are additionally used in the denoising operation, the blending weights calculated for each of the current image and the other image frame(s) may be combined and considered as one larger set of blending weights, which may be jointly normalized and then applied to produce the denoised current image. In other words, if the additional image used in the denoising operation at Step 466 is termed a "third image" (i.e., a third image, in addition to the current image and the accumulated image), then the method 450 may perform the additional steps of: calculating a multispectral guide image for a third image; determining third differences between pixels within blocks of pixels in the multispectral guide image for the third image and blocks of pixels in the multispectral guide image for the current image; and calculating blending weights for the third image based, at least in part, on the determined third differences. As may be appreciated, if a third image (or additional images) are included in the denoising operations, the additional blending weights calculated for the third image may also be included with the blending weights calculated for the current image and the accumulated image in the normalization and denoising operation of Step 464. The method 450 may then proceed to Step 468 to generate an output image based on the updated accumulated image.

If there are further images in the first plurality of multispectral images to process (i.e., "YES" at Step 470), the method 450 may return to Step 456 to continue processing on the next image in the first plurality of multispectral images. If, instead, there are no further images in the first plurality of multispectral images to process (i.e., "NO" at Step 470), the method 450 may terminate.

Exemplary Electronic Computing Devices

Figure 5:
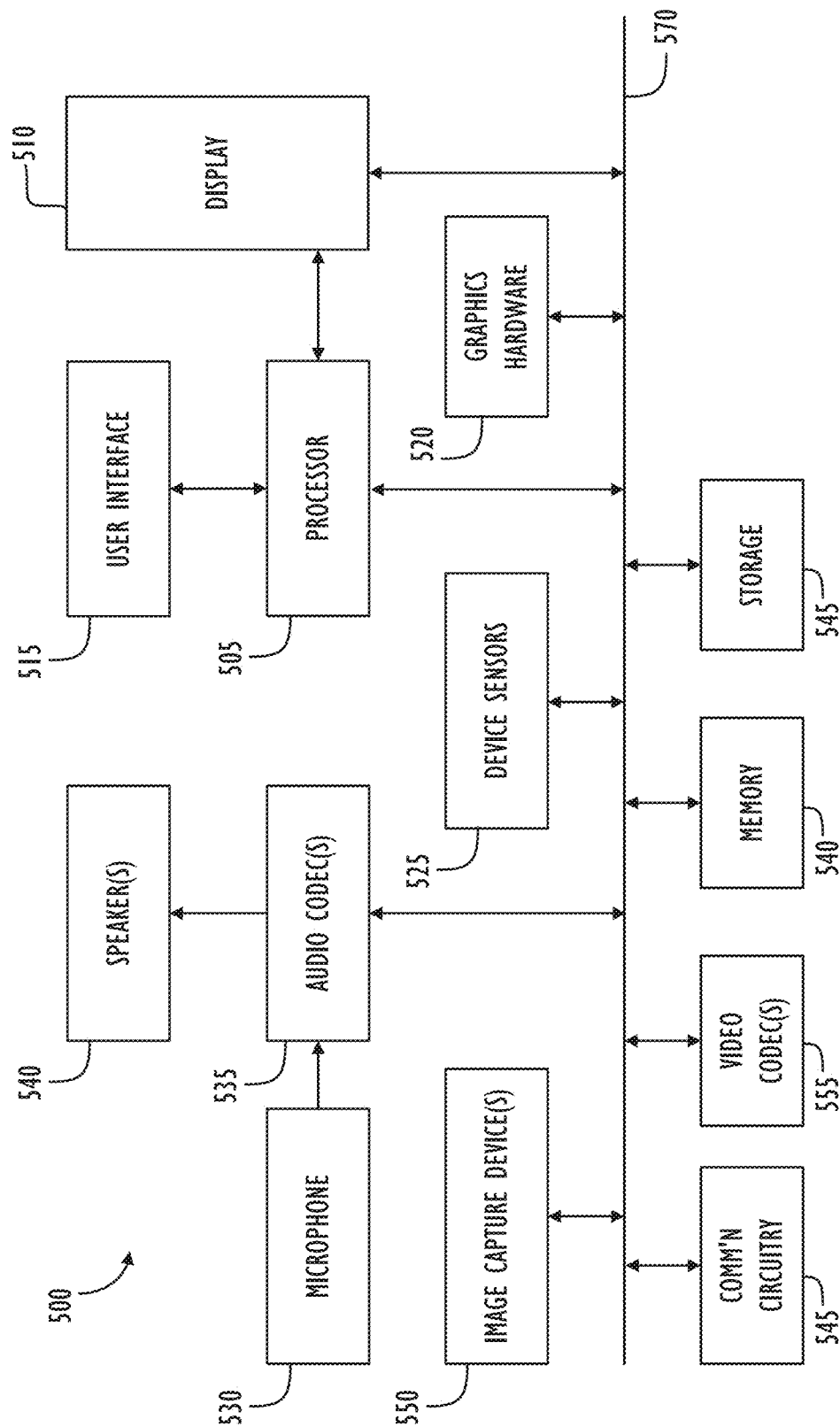
FIG. 5 is a block diagram illustrating a programmable electronic computing device, in which one or more of the techniques disclosed herein may be implemented.

Referring now to FIG. 5, a simplified functional block diagram of illustrative programmable electronic computing device 500 is shown according to one embodiment. Electronic device 500 could be, for example, a mobile telephone, personal media device, portable camera, or a tablet, notebook or desktop computer system. As shown, electronic device 500 may include processor 505, display 510, user interface 515, graphics hardware 520, device sensors 525 (e.g., proximity sensor/ambient light sensor, accelerometer, inertial measurement unit, and/or gyroscope), microphone 530, audio codec(s) 535, speaker(s) 540, communications circuitry 545, image capture device 550, which may, e.g., comprise multiple camera units/optical image sensors having different characteristics or abilities (e.g., Still Image Stabilization (SIS), HDR, OIS systems, optical zoom, digital zoom, etc.), video codec(s) 555, memory 560, storage 565, and communications bus 570.

Processor 505 may execute instructions necessary to carry out or control the operation of many functions performed by electronic device 500 (e.g., such as the generation and/or processing of images in accordance with the various embodiments described herein). Processor 505 may, for instance, drive display 510 and receive user input from user interface 515. User interface 515 can take a variety of forms, such as a button, keypad, dial, a click wheel, keyboard, display screen and/or a touch screen. User interface 515 could, for example, be the conduit through which a user may view a captured video stream and/or indicate particular image frame(s) that the user would like to capture (e.g., by clicking on a physical or virtual button at the moment the desired image frame is being displayed on the device's display screen). In one embodiment, display 510 may display a video stream as it is captured while processor 505 and/or graphics hardware 520 and/or image capture circuitry contemporaneously generate and store the video stream in memory 560 and/or storage 565. Processor 505 may be a system-on-chip (SOC) such as those found in mobile devices and include one or more dedicated graphics processing units (GPUs). Processor 505 may be based on reduced instruction-set computer (RISC) or complex instruction-set computer (CISC) architectures or any other suitable architecture and may include one or more processing cores. Graphics hardware 520 may be special purpose computational hardware for processing graphics and/or assisting processor 505 perform computational tasks. In one embodiment, graphics hardware 520 may include one or more programmable graphics processing units (GPUs) and/ or one or more specialized SOCs, e.g., an SOC specially designed to implement neural network and machine learning operations (e.g., convolutions) in a more energy-efficient manner than either the main device central processing unit (CPU) or a typical GPU, such as Apple's Neural Engine processing cores.

Image capture device 550 may comprise one or more camera units configured to capture images, e.g., images which may be processed to generate noise-reduced versions of said captured images, e.g., in accordance with this disclosure. Output from image capture device 550 may be processed, at least in part, by video codec(s) 555 and/or processor 505 and/or graphics hardware 520, and/or a dedicated image processing unit or image signal processor incorporated within image capture device 550. Images so captured may be stored in memory 560 and/or storage 565. Memory 560 may include one or more different types of media used by processor 505, graphics hardware 520, and image capture device 550 to perform device functions. For example, memory 560 may include memory cache, read-only memory (ROM), and/or random access memory (RAM). Storage 565 may store media (e.g., audio, image and video files), computer program instructions or software, preference information, device profile information, and any other suitable data. Storage 565 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 560 and storage 565 may be used to retain computer program instructions or code organized into one or more modules and written in any desired computer programming language. When executed by, for example, processor 505, such computer program code may implement one or more of the methods or processes described herein.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled.

What is claimed is:

1. A device, comprising:
a memory;
one or more image capture devices;
a user interface; and one or more processors operatively coupled to the memory, wherein the one or more processors are configured to execute instructions causing the one or more processors to:

maintain an accumulated image in the memory;

obtain a first plurality of multispectral images; and for each image in the first plurality of multispectral images, perform the following operations:

calculate a multispectral guide image for a current image of the first plurality of multispectral images;

calculate a multispectral guide image for the accumulated image;

determine first differences between pixels within first blocks of pixels in the multispectral guide image for the current image and second blocks of pixels in the multispectral guide image for the current image;

determine second differences between pixels within blocks of pixels in the multispectral guide image for the accumulated image and blocks of pixels in the multispectral guide image for the current image;

calculate blending weights for the current image and the accumulated image based, at least in part, on the determined first differences and second differences;

denoise the current image based on the calculated blending weights;

update the accumulated image based on the denoised current image; and generate a noise-reduced output image based on the updated accumulated image.

2. The device of claim 1, wherein the first plurality of multispectral images comprises RGB-IR images.

3. The device of claim 2, wherein the instructions to determine the first differences and the second differences are executed prior to any decorrelation of RGB image data from IR image data.

4. The device of claim 1, wherein the blocks of pixels comprise neighborhoods of pixels around a central pixel, and wherein the blocks of pixels have dimensions that are determined based, at least in part, on an amount of available pixel lines in memory during execution.

5. The device of claim 1, wherein the multispectral guide image for the accumulated image is formed by: performing a maximum operation across the image channels of the accumulated image at each pixel location.

6. The device of claim 1, wherein at least one of the first differences or the second differences comprise: noise-normalized differences based on an expected noise level.

7. The device of claim 1, wherein the instructions further comprise instructions causing the one or more processors, for a given current image of the first plurality of multispectral images, to:

calculate a multispectral guide image for a third image;

determine third differences between pixels within blocks of pixels in the multispectral guide image for the third image and blocks of pixels in the multispectral guide image for the given current image; and calculate blending weights for the third image based, at least in part, on the determined third differences.

8. The device of claim 7, wherein the third image comprises an image captured after the given current image.

9. The device of claim 1, wherein the blending weights for the current image and the accumulated multispectral guide image are normalized prior to execution of the instructions to denoise the current image based on the calculated blending weights.

10. A non-transitory computer readable medium comprising computer readable instructions configured to cause one or more processors to:

maintain an accumulated image in a memory;

obtain a first plurality of N-channel multispectral images, wherein the first plurality of N-channel multispectral images comprise images having at least one visible light channel and one non-visible light channel; and for each image in the first plurality of N-channel multispectral images, perform the following operations:

calculate a multispectral guide image for a current image of the first plurality of N-channel multispectral images based, at least in part, on the non-visible light channel from the current image;

calculate blending weights for the current image based, at least in part, on the multispectral guide image for the current image;

apply the calculated blending weights to each of the N-channels of the current image to generate a denoised current image;

update the accumulated image based, at least in part, on pixel differences between the denoised current image and the accumulated image; and generate a noise-reduced output image based on the updated accumulated image.

11. The non-transitory computer readable medium of claim 10, wherein the first plurality of multispectral images comprises RGB-IR images.

12. The non-transitory computer readable medium of claim 11, wherein the instructions to apply the calculated blending weights to the current image to generate a denoised current image further comprise instructions to apply the calculated blending weights to each of N-channels of the current image in parallel.

13. The non-transitory computer readable medium of claim 10, wherein the multispectral guide image for a given current image is formed by: performing a maximum operation across the N image channels of the given current image.

14. The non-transitory computer readable medium of claim 10, wherein the instructions to calculate blending weights for the current image based, at least in part, on the multispectral guide image further comprise instructions to: determine differences between pixels within first blocks of pixels in the multispectral guide image for the current image and second blocks of pixels in the multispectral guide image for the current image.

15. The non-transitory computer readable medium of claim 10, wherein the instructions to update the accumulated image based, at least in part, on pixel differences between the denoised current image and the accumulated image further comprise instructions to:

update the accumulated image using a weighting parameter determined based on a noise-normalized difference between the denoised current image and the accumulated image.

16. An image processing method, comprising:

maintaining an accumulated image in a memory;

obtaining a first plurality of N-channel multispectral images, wherein the first plurality of N-channel multispectral images comprise images having at least one visible light channel and one non-visible light channel; and for each image in the first plurality of N-channel multispectral images, perform the following operations:

calculating a multispectral guide image for a current image of the first plurality of N-channel multispectral images based, at least in part, on the non-visible light channel from the current image;

calculating blending weights for the current image based, at least in part, on the multispectral guide image for the current image;

applying the calculated blending weights to each of the N-channels of the current image to generate a denoised current image;

updating the accumulated image based, at least in part, on pixel differences between the denoised current image and the accumulated image; and generating a noise-reduced output image based on the updated accumulated image.

17. The method of claim 16, wherein applying the calculated blending weights to the current image to generate a denoised current image further comprises applying the calculated blending weights to each of N-channels of the current image in parallel.

18. The method of claim 16, wherein the multispectral guide image is formed by: performing a maximum operation across the N image channels of the current image.

19. The method of claim 16, wherein calculating blending weights for the current image based, at least in part, on the multispectral guide image further comprises: determining differences between pixels within first blocks of pixels in the multispectral guide image for the current image and second blocks of pixels in the multispectral guide image for the current image.

20. The method of claim 16, wherein updating the accumulated image based, at least in part, on pixel differences between the denoised current image and the accumulated image further comprises:

updating the accumulated image using a weighting parameter determined based on a noise-normalized difference between the denoised current image and the accumulated image.

* * * * *